United States Patent
Fay et al.

(10) Patent No.: US 7,651,581 B2
(45) Date of Patent: Jan. 26, 2010

(54) CATALYST COATED DIFFUSION MEDIA

(75) Inventors: Matthew M. Fay, Rochester, NY (US);
Bhaskar Sompalli, Rochester, NY (US);
Susan G. Yan, Fairport, NY (US);
Hubert A. Gasteiger, Rochester, NY (US); Matthew J. Beutel, Webster, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/313,163

(22) Filed: Dec. 20, 2005

(65) Prior Publication Data

US 2007/0137783 A1 Jun. 21, 2007

(51) Int. Cl.
*B29C 65/02* (2006.01)
*B32B 37/06* (2006.01)
*C08J 5/20* (2006.01)

(52) U.S. Cl. .............. 156/308.2; 156/309.6; 156/309.9
(58) Field of Classification Search ................. 156/289, 156/308.2, 309.6, 309.9; 429/30, 33, 34, 429/35, 36, 38
See application file for complete search history.

(56) References Cited

U.S. PATENT DOCUMENTS

| | | | | |
|---|---|---|---|---|
| 4,469,649 A * | 9/1984 | Ibar | .......................... | 264/443 |
| 5,178,968 A * | 1/1993 | Roche | .......................... | 429/18 |
| 5,349,741 A * | 9/1994 | Neuenschwander | .......... | 29/598 |
| 5,773,162 A * | 6/1998 | Surampudi et al. | ............ | 429/39 |
| 5,961,796 A * | 10/1999 | Hitchens et al. | ............. | 204/252 |
| 2003/0232714 A1* | 12/2003 | Yan | ............................. | 502/101 |
| 2004/0209148 A1* | 10/2004 | Ohara et al. | .................. | 429/35 |
| 2005/0067345 A1 | 3/2005 | Prugh et al. | | |
| 2005/0100776 A1* | 5/2005 | Brunk et al. | .................. | 429/35 |

FOREIGN PATENT DOCUMENTS

JP 2003036862 A * 2/2003

OTHER PUBLICATIONS

English Abstract of JP 2003-36862.*
Machine English translation of JP 2003-36862.*

* cited by examiner

*Primary Examiner*—Philip C Tucker
*Assistant Examiner*—Sing P Chan

(57) ABSTRACT

A method of manufacturing a fuel cell membrane electrode assembly comprising forming and compressing a stack having a plurality of layers in a desired orientation. The layers comprise a membrane, a cathode, an anode, and at least one edge protection layer. The method includes providing at least one mechanical reinforcing layer adjacent the anode or cathode layer, and allowing the electrodes to relax under high heat to remove stress prior to lamination.

11 Claims, 2 Drawing Sheets

CATALYST COATED DIFFUSION MEDIA

FIELD OF THE INVENTION

The present invention relates to fuel cells and fuel cell diffusion media, and more particularly to methods of manufacturing a membrane electrode assembly.

BACKGROUND OF THE INVENTION

Electrochemical cells, such as fuel cells, generate electrical power through the electrochemical reaction of a reactant and an oxidant. An exemplary fuel cell has a membrane electrode assembly (MEA) with catalytic electrodes and a proton exchange membrane (PEM) sandwiched between the electrodes. In preferred PEM type fuel cells, hydrogen is supplied as a reductant to an anode and oxygen is supplied as an oxidant to a cathode. PEM fuel cells reduce oxygen at the cathodes and generate an energy supply for various applications, including vehicles.

For ease of production, fuel cells are typically manufactured using subassemblies. A fuel cell will contain as a subassembly either a catalyst coated membrane (CCM) or a catalyst coated diffusion media (CCDM). Various manufacturing methods have been developed for manufacturing CCMs. Lamination techniques used to manufacture CCDMs often result in the presence of a significant amount of stress that is visually indicated by a "bowing" effect in a laminated subassembly. Post-lamination relief of stress is often accompanied by unwanted cracking and destruction of the diffusion media.

Various means of circumventing this stress-relief problem have been explored and have included an undesired altering of physical characteristics of the fuel cell components, including size and shape. Thus there remains a need for a method of manufacturing CCDM at a high volume production that avoids problems associated with known processes and improves fuel cell performance, efficiency, and lifespan.

SUMMARY OF THE INVENTION

The present invention provides a method of manufacturing a fuel cell membrane electrode assembly having catalyst coated diffusion media. In a first embodiment, the method includes forming a stack having a plurality of layers in a desired orientation. The layers include a membrane, a cathode, an anode, at least one edge protection layer, and at least one mechanical reinforcing layer adjacent to at least one of the cathode and anode. The stack is placed into a press assembly having a heat source. The stack is heated and compressed at a desired temperature and pressure for a predetermined time and then removed from the press assembly. The mechanical reinforcing layer is then removed from the membrane electrode assembly. In certain embodiments, the mechanical reinforcing layer comprises expanded PTFE.

In another embodiment, the method of the present invention provides forming a stack comprising a membrane, a cathode, an anode, and at least one edge protection layer. The method includes heating the stack to a desired temperature without adding pressure for an effective amount of time to allow the layers to relax. Various embodiments include heating the stack to a temperature near, but not exceeding, the glass transition temperature of at least one of the membrane and edge protection layer. Once relaxed, a compressive force is applied to the stack, exerting from about ½ to 15 tons of pressure for a time of between about 4 to 8 minutes.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of at least that which may arise from ordinary methods of measuring such a value.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The manufacturing of fuel cells is simplified and more accurate through the use of various subassemblies. One such subassembly is a 5-layer laminated membrane electrode assembly (MEA). This 5-layer MEA includes a membrane, an edge protection layer on either side of the membrane, and a catalyst coated diffusion media (CCDM) disposed adjacent the opposing side of each edge protection layer. The use of a 5-layer component is beneficial during the fuel cell stack assembly since the diffusion media is prebonded to the membrane. This leads to a single alignment and placement of softgoods during the cell assembly, rather than having to carefully align the individual placement of numerous components.

The present invention provides a method of manufacturing a laminated MEA having CCDM. The method includes forming a stack comprising a plurality of layers in a desired orientation. The layers preferably include a membrane, a cathode, an anode, at least one edge protection layer, and at least one mechanical reinforcing layer placed adjacent the outside of at least one of the cathode and anode. The stack is placed into a press assembly having a heat source and is heated and pressed to a desired temperature and pressure for a predetermined time and then removed from the press assembly for use in a fuel cell.

Figure 1:
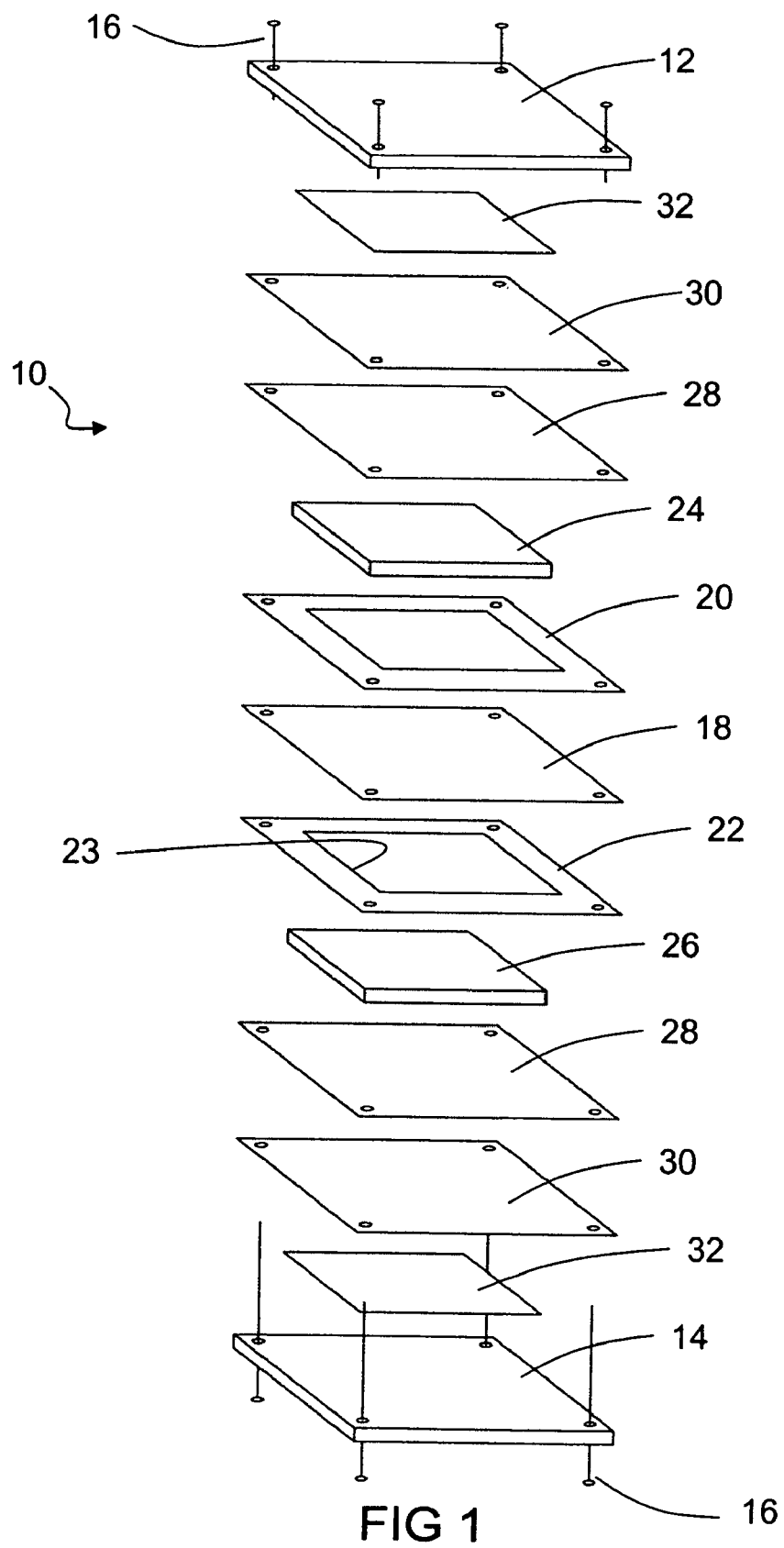
FIG. 1 is a schematic, exploded, illustration of an exemplary alignment fixture including the individual components of the membrane electrode assembly.

To gain a better understanding of the present invention, an exemplary alignment fixture 10 according to the principles of the present invention is shown in FIG. 1. The alignment fixture 10 allows for the accurate alignment and compression of the various components of an MEA and includes at least a rigid top base plate 12 and a rigid bottom base plate 14 with means of securing various layer components there between.

In one presently preferred embodiment, positioning of the fixture 10 is accomplished with the use of alignment pins 16 that are detachably secured to the base plates 12, 14 and go through various components of the assembly. In certain embodiments, the pins 16 have removable long washers (not shown) that can act as spacers if so desired.

FIG. 1 illustrates one presently preferred arrangement of the various subassembly component layers and materials used in the MEA formation. In the center of the MEA is the proton exchange membrane (PEM) 18. The PEM is selected from typical membrane materials used in the art. It is important to note the selection of the particular membrane material, as well as the components in the catalyst layer, will influence the lamination conditions as will be discussed in more detail below. Preferably, the membrane 18 is placed over the alignment pins 16.

Adjacent opposite sides of the membrane 18 are the cathode side edge protection layer 20 and the anode side edge protection layer 22. Presently preferred materials for use as edge protection layers include poly(ethylene terephthalate) or polyimide films, such as MYLAR® and KAPTON®, respectively, both available from DuPont de Nemours and Company, Inc, or various polyvinylidene fluoride (PVDF) components as are known in the art. Of particular importance is the alignment of each of the edge protection layers 20, 22 relative to one another, as well as the edge protection layers relative to the catalyst layer edges. Preferably, the edge protection layers 20, 22 are placed over the alignment pins 16.

Adjacent the edge protection layers 20, 22 are the respective cathode side and anode side CCDMs 24, 26. It is common for the 5 layer MEA to be assembled with the anode side face down. In certain embodiments, the anode side edge protection layer 22 may have a larger active area window 23 than the cathode side edge protection layer 20. In other embodiments, the cathode side edge protection layer 20 may have a larger active area window 23 than the anode side edge protection layer 22. In still other embodiments, the active area windows 23 are the same size on the anode and cathode. In other embodiments, the two sides of the MEA are symmetric, and a distinction may not be necessary between the cathode 24 and anode 26, but it is still good practice to designate the two sides of the MEA. The CCDM layers 24, 26 are preferably pre-cut to desired dimensions, and are not placed over the alignment pins 16.

In certain embodiments, at least one mechanical reinforcing layer 28 is placed adjacent the cathode 24, the anode 26, or both. This reinforcement layer 28 provides mechanical support during the pressurized lamination step and also while the assembly is being cooled after lamination. The reinforcement layer 28 preferably has good mechanical strength in the X-Y plane (parallel to the diffusion media). In various embodiments the layer 28 is peelable after being placed on a substrate, for example, it is easily removed from the diffusion media without damage. In various preferred embodiments, the reinforcement layer comprises a thin film of expanded polytetrafluoroethylene (ePTFE), having a thickness from between about 1 to about 5 mil (about 25 to about 125 μm), preferably about 3 mil (75μm). Since it is believed most likely during the transition from high temperature and pressure to ambient temperature and pressure that the diffusion layer is most likely to suffer additional stress and crack, the mechanical reinforcement layer serves to provide stress absorption, or relief. Suitable ePTFE is commercially available under the tradename GORETEX® available from W.L. Gore and Associates, Inc., Elkton, Md., and under the tradename TETRATEX® available from Tetratec, Featerville, Pa. Preferably, the mechanical reinforcing layers 28 are placed over the alignment pins 16. In various embodiments, the mechanical reinforcing layer is recyclable, for example, it is retained and reused for further subassembly manufacturing.

In various embodiments, release sheets 30 may be provided adjacent either the electrodes 24, 26 or the mechanical reinforcing layers 28. The release sheets 30 preferably comprise a suitable material that does not stick or adhere to the diffusion media or membrane and is easily removed after the lamination process. In various embodiments, a polyimide film is used, such as that sold under the tradename KAPTON®, available from DuPont de Nemours and Company, Inc. The polyimide release sheets 30 are placed on the alignment pins 16 and can be used in applications at temperatures as high as 400° C.

Finally, between the release sheets 30 and the base plates 12, 14 may be a layer of material 32 that assists in distributing lateral forces incurred during the lamination. One presently preferred lateral force distributor 32 is available under the tradename GYLON® available from Garlock Sealing Technologies, Palmyra, N.Y. The main purpose of this force distribution layer 32 is to evenly spread the compressive forces during the lamination step of the method. Since this layer 32 will become thinner and expand in the planar direction during compression, this layer should not be placed over the alignment pins as it may cause unwanted buckling. It should be understood that while FIG. 1 illustrates the use of one force distribution layer 32 adjacent both base plates 12, 14, in certain embodiments it may be desirable to use more or less layers 32 as needed.

Figure 2:
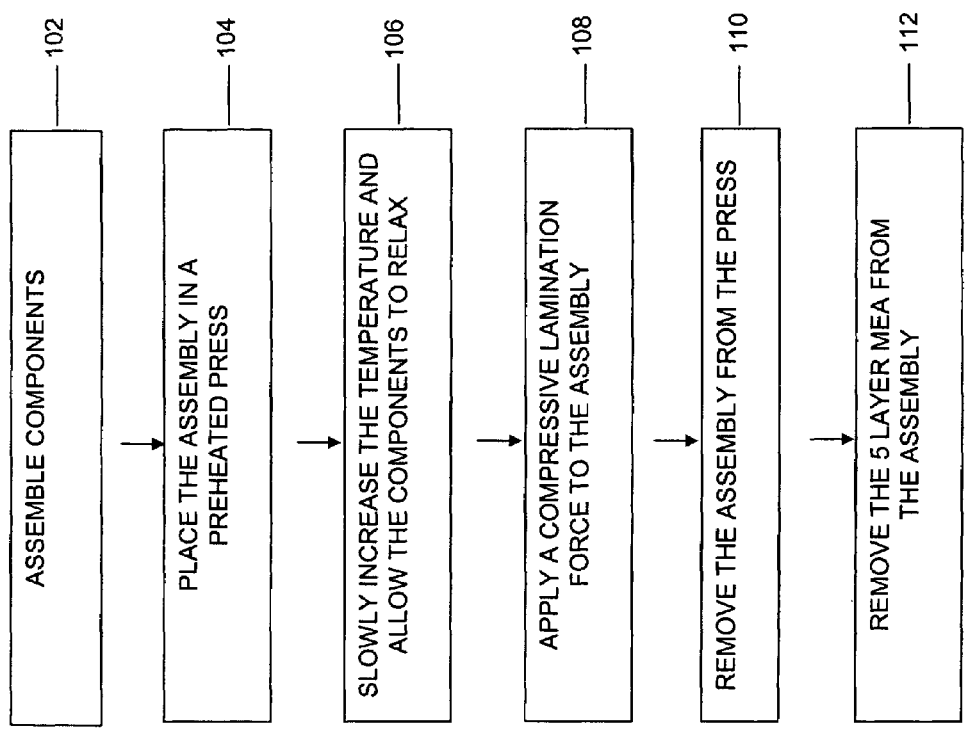
FIG. 2 is a flow diagram of a method of manufacturing a membrane electrode assembly according to the principles of the present invention.

Referring now to FIG. 2, a method of laminating a 5 layer MEA structure according to the principles of the present invention is illustrated schematically. It should be noted that the appropriate lamination conditions, including the temperature, pressure and lamination time are selected based on the membrane type, the components in the catalyst layers, and the overall geometry of the catalyst layers. For illustrative purposes, the temperatures and pressures provided herein are based on the use of an MEA having an area of about 520 cm², with an ACIPLEX® SF1101 PFSA membrane available from Asahi-Kasei, and a 900 EW PFSA ionomer in the catalyst layer. It is contemplated that the present invention is suitable with the use of a variety of different materials and with assemblies having an area from about 50 cm² to 800 cm², or greater.

The process 100 begins by first assembling and aligning all of the components into a desired stack orientation in the alignment fixture 10 as previously described, indicated by block 102. While the use of an alignment fixture 10 is not essential, it is recommended for speed, accuracy, and consistency. Once assembled, the alignment fixture 10, or stack, is inserted into a preheated press assembly, indicated by block 104, preferably having heated press platens. The alignment fixture 10, or stack, is allowed to heat up to a desired lamination temperature, and the components are preferably allowed to relax under high heat prior to the application of a lamination force as indicated by block 106. As used herein, allowing the components to "relax" includes allowing the components to relieve any built-up stress, caused by the application of heat, prior to being pressed, preferably with the assistance of the mechanical reinforcing layer 28.

In various embodiments, the method includes heating the stack to a temperature and for a time sufficient to allow relaxation of at least one of the anode and cathode layers. In preferred embodiments, the stack is heated to a temperature near, but not exceeding, the glass transition temperature of one of the membrane 18 and the edge protection layers 20, 22. While the time and temperature will vary with the thermal properties of the materials selected for use, in various embodiments, the press assembly is heated to a temperature between about 250° F. to about 350° F., or higher.

Once the components have had an opportunity to relax, an appropriate lamination force is applied to the stack of components as indicated by block 108. It should be understood that the pressure and time may vary with material type and size used, and the equivalent pressures and times are within the scope of the present invention. For example, an MEA having an area of about 50 cm$^2$ would require a press force of about ⅔ ton, while an MEA having an area of about 800 cm$^2$ would likely require a press force of about 11 tons. In various embodiments, the stack is compressed by applying a suitable compressive force, for example, exerting from about ½ to about 15 tons of pressure for a time between about 4 to about 8 minutes. In certain embodiments, the pressure range is between about 5 to about 8 tons. After the pressurized lamination step is complete, the assembly is cooled and removed from the press as indicated by block 110. In various embodiments, the assembly is removed from the press immediately after application of the compressive force, while it is still hot. In various other embodiments, the assembly remains in the press while the plates are actively cooled with the applied compressive force maintained. In one preferred embodiment of disassembly, the top plate is removed first, and the components are slid off from the bottom plate, except for the lowermost release sheet 30 and lateral force distributor 32. After cooling, the upper release layer 30 and mechanical reinforcing layer 28 are removed as indicated by block 112, leaving a 5-layer MEA for use in a fuel cell. Thus, the present invention allows the formation of an improved, low-stress MEA that results in less bowing within the 5-layers, and allows for greater ease in the subsequent fuel cell stack assembly.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of manufacturing a fuel cell membrane electrode assembly comprising:
    forming a stack having a plurality of layers, the layers comprising a membrane, a cathode, an anode, and at least one edge protection layer, wherein the membrane is between the cathode and the anode and one of the at least one edge protection layer is between the membrane and one of the cathode or the anode;
    placing the stack into a press assembly having a heat source;
    heating the stack without adding pressure to a temperature and for a time sufficient to allow at least one of the anode and cathode layers to relax,
    pressing the heated stack to a desired pressure for a predetermined time; and
    removing the pressed membrane electrode assembly.

2. A method according to claim 1, wherein the stack further comprises at least one mechanical reinforcing layer adjacent the cathode or anode.

3. The method according to claim 2, wherein the mechanical reinforcing layer comprises expanded PTFE.

4. The method according to claim 1, wherein heating the stack comprises heating the press assembly to a temperature between about 250° to about 350° F.

5. The method according to claim 1, wherein pressing the stack comprises applying a compressive force exerting from about ½ to about 15 tons of pressure for a time between about 4 to about 8 minutes.

6. The method according to claim 1, further comprising actively cooling the press assembly while maintaining the desired pressure prior to removing the pressed membrane electrode assembly.

7. The method according to claim 1, wherein the press assembly comprises an upper press plate and a lower press plate, further wherein forming the stack comprises placing a non-rigid lateral force distribution layer between at least one of the upper and lower press plates and the stack, wherein the lateral force distribution layer expands in a planar direction and spreads the compressive forces during pressing.

8. The method according to claim 7, further comprising placing a release material between the lateral force distribution layer and the press plate.

9. The method according to claim 1, wherein one or both of the cathode and the anode is a catalyst coated diffusion membrane.

10. The method according to claim 1, wherein one edge protection layer is between the membrane and one of the cathode and one edge protection layer is between the membrane and the anode.

11. The method according to claim 1, comprising heating the stack to a temperature not exceeding the glass transition temperature of one of the membrane and the edge protection layer.

* * * * *